Aug. 28, 1962  M. MacPHEE ETAL  3,051,557
MANUFACTURE OF PURE SILICON
Filed March 10, 1959
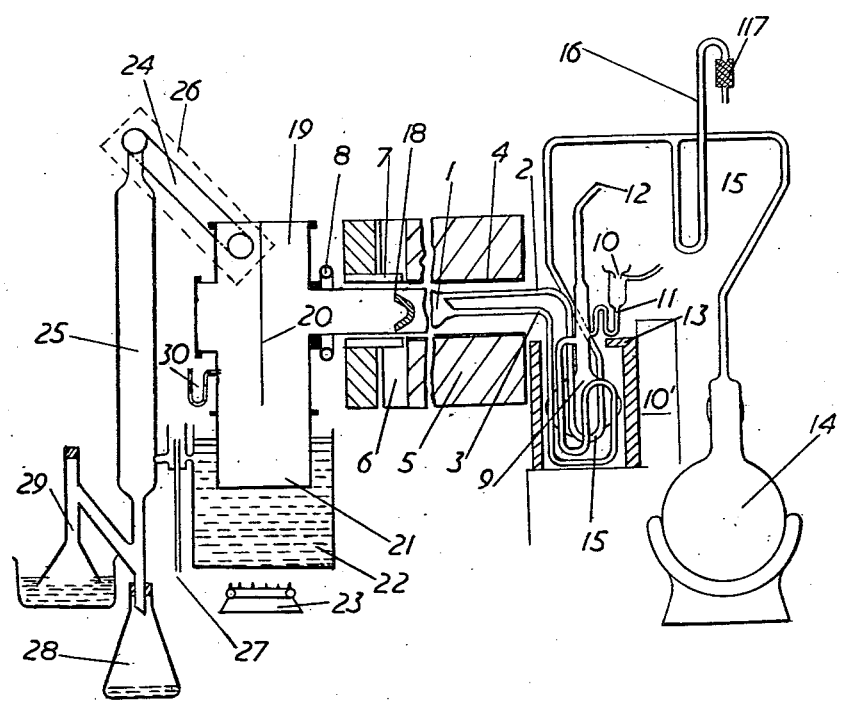
*Inventor*
M. MacPhee - D.E. Bolger
By *R.P. Morris*
*Attorney*

3,051,557
MANUFACTURE OF PURE SILICON
Malcolm MacPhee and Derek Edwin Bolger, Aldwych, London, England, assignors to International Standard Electric Corporation, New York, N.Y.
Filed Mar. 10, 1959, Ser. No. 798,502
Claims priority, application Great Britain Mar. 12, 1958
2 Claims. (Cl. 23—263)

This invention relates to the manufacture of pure silicon.

It has previously been proposed in U.S. Patent No. 2,773,745 to produce substantially pure silicon by the vapour phase reaction of purified zinc with excess of purified silicon tetrachloride.

One object of the present invention is to improve the efficiency of this process and to provide apparatus for attaining this increased efficiency.

It is a further object of the invention to increase the purity of the silicon resulting from this process.

In the above mentioned U.S. patent it is pointed out that it is required to produce silicon in coarse crystalline form. It has been found, however, that in carrying out the process a considerable quantity of silicon in the form of fine dust is produced. It has also been found that the greater part of this fine dust silicon is carried away from the reaction chamber, with the zinc chloride resulting from the reaction. We have also found that these results have been due to reaction between the zinc vapour and silicon tetrachloride taking place away from the walls of the reaction chamber, largely as a consequence of turbulence within that chamber.

According to the present invention these defects are largely removed by arranging the inlet pipes for the two reactants to be parallel with one another and with the axis of the cylindrical reaction chamber and by arranging a baffle to force the entering vapour stream against the hot walls of the reactor.

We have found that it is advisable to maintain a constant ratio between the volumes of the two vapours. Any change in the rate of feed of either or both of the reactants which persists for longer than about twenty seconds is found to alter materially the composition of the atmosphere throughout the whole length of the reactor.

To overcome any defects of this kind, according to the present invention a manometer containing silicon tetrachloride is provided not only to measure the pressure but also to act as a pressure-controlled reservoir to keep the flow of silicon tetrachloride to the reactor constant.

Moreover, hold-up of silicon tetrachloride in the zinc chloride condenser at the outlet from the reaction chamber is prevented by maintaining this condenser and the exit pipes therefrom at a temperature above the boiling point of silicon tetrachloride.

These improvements and others will be clear from the following description taken in conjunction with the accompanying drawing, which shows apparatus according to the invention.

Referring to the drawing, the main reaction vessel 1 is a cylindrical tube made of translucent quartz open at the left hand end in the drawing and having inlet tubes 2 and 3 at the right hand end. The tube 3 extends along a continuation of the central axis of vessel 1, and tube 2 is parallel to it and enters vessel 1 near its periphery.

Surrounding the greater part of the length of the reaction vessel 1 and extending also over part of the lengths of inlet tubes 2 and 3 is a quartz tube 4 and around this tube is an electrically heated furnace 5. Connections are made to the heating elements of the furnace by a junction box 6, and in order to prevent the portion of the vessel 1 within this junction box being cooled, a cylindrical electric heater 7 is placed within the junction box and forms an extension to the main furnace outside the quartz tube 4.

The heater 7 is supplied separately from the heaters for furnace 5. To the left of the heater 7 is a gas ring heater 8 to keep the left-hand (exit) end of the reaction vessel 1 sufficiently hot to prevent condensation of zinc chloride.

Zinc vapour is supplied to vessel 1 through the inlet tube 3 which communicates with a vessel 9 of quartz. Molten zinc is poured into vessel 9 through a filling funnel 10 and a zinc trap 11 is provided between the funnel 10 and the vessel 9. Argon gas is introduced through inlets 12 and 16 to provide an inert atmosphere on either side of the zinc in the trap 11, and to prevent zinc entering the tetrachloride supply tube. The vessel 9 communicates with inlet tube 3 through a quartz tube convoluted in three planes at right angles to one another to impart a degree of elasticity to the connection. These convolutions and the vessel 9 are within an electrically heated furnace 10'. As the convolutions surround the vessel 9 they are closer to the heating elements of the furnace 10' and serve to superheat the zinc vapour on its passage from the vessel 9 in which it is boiled to the reaction vessel 1. The zinc trap 11 is kept above a shelf 13 of brick which protects the trap from the full heat of the furnace but enables it to keep hot enough to prevent zinc in the trap from solidifying.

Purified silicon tetrachloride is fed to inlet tube 2 from a quartz boiler 14 through a quartz pipe 15 which is convoluted for elasticity and passes through the interior of the furnace 10. This ensures the cracking of any carbon compounds that may be present in the silicon.

Communicating with the tube 15 is a manometer 16 in the form of a U-tube filled with liquid silicon tetrachloride to a level nearly up to its junction with the tube 15. This acts not only as a manometer but also as a pressure controlled reservoir automatically correcting pressure fluctuations in the system. If during the reaction there is a drop of pressure within the system, a small quantity of liquid silicon tetrachloride is injected into the vapour line, due to the rise in level in the inner arm of the U-tube 16. This liquid on entering the portion of the tube 15 within the furnace 10' immediately vapourises and raises the pressure. Conversely if the pressure in the system rises the liquid level in the inner arm of the U-tube 16 falls and the level is made up by condensation of vapour from the tube 15. This decreases the amount of vapour passing to the reactor. In normal operation the liquid level fluctuates gently over a range of about quarter of an inch and maintains the pressure within corresponding limits. The open end of the manometer 16 is connected to an enlarged portion 17 filled with silica gel to prevent moisture entering the outer limb of the U-tube.

To start with, the whole of the system is flushed out with dry air introduced through the inlets 12, the manometer 16 being empty and the boiler 14 disconnected. When the system is considered to be thoroughly dry the boiler 14 is filled with the requisite quantity of distilled silicon tetrachloride and connected to the tube 15.

The temperature of the zinc boiler 9 and that of the furnace 5, is gradually raised and the system is flushed with nitrogen. When all the air has been swept out, the nitrogen is cut off and replaced by purified argon. The zinc trap 11 is heated and molten zinc poured therein.

Temperatures of the furnaces 5 and 10' are now rapidly increased, until the temperature within vessel 1 increases to 1020° C. and that within boiler 9 to 1050° C. Molten zinc is then poured into the zinc boiler 9. Heat is applied to boiler 14 to bring the tetrachloride rapidly to the boil and flush the whole system. Argon continues to be fed to tube 12 but is cut off from manometer tube 16 and the outer limb of this tube temporarily plugged. Silicon tetrachloride condenses in the tube 16 until it fills it and the plug is then removed from the outer limb.

When the silicon tetrachloride is issuing from the vessel 1 in a steady stream, the zinc in boiler 9 is boiled and the boiling rate controlled thereafter by holding the temperature of boiler 9 at 1050° C. The flow of tetrachloride is maintained at a rate sufficient to keep it in excess of the zinc vapour.

As stated above, the inlet tubes 2 and 3 into the reaction vessel 1 for silicon tetrachloride and zinc vapour, respectively, are arranged parallel to one another and to the axis of vessel 1. This is found to minimise turbulence of the two streams entering the vessel 1. A further expedient to this end is a baffle 18 which is crucible-shaped and is placed in the middle of the hot region in the vessel 1 with its smaller end towards the inlets and thus forces the vapour streams against the hot walls of the reactor vessel.

This arrangement minimises turbulence as the two vapour streams are found to mix relatively slowly by diffusion. Large crystals are then formed as the two streams are deflected to the hot walls of the reaction vessel and there is a minimum of loss due to silicon smoke being produced and swept out of the reaction vessel.

In order to prevent the outlet from the reaction vessel 1 becoming clogged with deposits of zinc chloride, the following arrangements are made. The exit end of the reaction vessel 1 is sealed to a vessel 19, the lid of which is fitted with baffle plates 20.

The gas ring 8 prevents deposition of zinc chloride within the vessel 1 in the exit portion thereof and ensures its deposition in vessel 19. The bottom half 21 of vessel 19 is detachable for ease of emptying and clearing. This bottom half 21 is surrounded by a hot water jacket 22 heated by a gas ring 23 and kept full of water by a constant level device. The vessel 19 is thus kept at a temperature above the boiling point of silicon tetrachloride.

An uptake pipe 24 from the vessel 19 communicates with a condenser 25 for tetrachloride vapour. The pipe 24 is surrounded by a hot air muff 26 which ensures that silicon tetrachloride will not condense until reaching the condenser 25. The condenser 25 is water cooled and the water outlet communicates with the hot water jacket 22, an overflow outlet 27 from the jacket 22 being provided. This inlet and outlet for water in the jacket 22 constitute the constant level device above referred to.

Condensed silicon tetrachloride vapour is collected in a flask 28, and the outlet from condenser 25 is provided with a vapour trap 29 consisting of an inverted funnel dipping into water.

A manometer 30 filled with oil and communicating with vessel 19 indicates the pressure therein.

With regard to the operating of the above apparatus, the temperature of the reaction is kept between 1000° C. and 1100° C. We prefer a temperature of 1020° C. As stated in the above U.S. patent, an excess of silicon tetrachloride is maintained. The silicon, of course, remains in the reaction vessel 1.

The apparatus above described facilitates the maintenance of this excess of silicon tetrachloride. The hot water jacket 22 and the hot air muff 26 ensure that silicon tetrachloride is condensed only in the condenser 25, so that the drip of condensed tetrachloride from this condenser is a true measure of tetrachloride vapour flow and hold-up of tetrachloride in the vessel 19, in which zinc chloride is condensed, is prevented.

By the use of the above described apparatus we have consistently produced silicon with a high yield 70% of crystalline silicon. The greater part of this consists of large crystals, of high purity, i.e. with a zinc content of less than 1.4 parts per million from which single crystals can be grown containing less than 1 part per million of zinc and about 0.1 part per million of other impurities.

While the principles of the invention have been described above in connection with specific embodiments, and particular modifications thereof, it is to be clearly understood that this description is made only by way of example and not as a limitation on the scope of the invention.

What we claim is:

1. Apparatus for the manufacture of substantially pure silicon by the reaction of zinc vapour with silicon tetrachloride vapour comprising a furnace, an elongated reaction vessel having an open end and a closed end, said vessel being horizontally disposed within said furnace with the open end protruding from said furnace, first and second inlet pipes connected to the closed end of said vessel, said pipes extending substantially parallel to the axis of said reaction vessel for a distance within said furnace, a crucible-shaped baffle within said reaction vessel adjacent the closed end thereof for directing vapours entering from said inlet pipes towards the walls of said vessel with a minimum of turbulence, a vapour-generating vessel adapted to contain molten zinc connected to said first inlet pipe by means of a first convoluted connecting pipe, a furnace for maintaining said vapour-generating vessel at a predetermined vapour-generating temperature and containing convolutions of said first convoluted connecting pipe, whereby zinc vapor within said pipe is superheated, a boiler adapted to contain silicon tetrachloride connected to said second inlet pipe by means of a second convoluted connecting pipe having convolutions within said furnace, means for maintaining said boiler at a predetermined vapour-generating temperature, means for automatically maintaining a substantially constant pressure of vapour in said second inlet pipe comprising a manometer tube connected to said second inlet pipe and adapted to contain a quantity of silicon tetrachloride, deposition means connected to the open end of said reaction vessel, and condensing means connected to said deposition means.

2. Apparatus, as defined in claim 1, in which the deposition means comprises a deposition vessel larger than said reaction vessel having an inlet on one side and an outlet at its upper end, the condensing means being connected to said outlet, means for attaching the open end of said reaction vessel to said inlet, means for maintaining the lower end of said deposition vessel at a predetermined temperature above the boiling point of silicon tetrachloride, and a baffle attached to the upper end of said deposition vessel and extending downwardly between said outlet and said inlet, whereby vapours entering said inlet must pass down under said baffle and through the lower end of said deposition vessel to reach said outlet, and additional means for maintaining the temperature of the open end of said reaction vessel at a predetermined temperature to prevent condensation at said open end.

References Cited in the file of this patent

UNITED STATES PATENTS

| | | |
|---|---|---|
| 2,773,745 | Butler et al. | Dec. 11, 1956 |
| 2,785,051 | Miller | Mar. 12, 1957 |
| 2,912,311 | Mason et al. | Nov. 10, 1959 |

FOREIGN PATENTS

| | | |
|---|---|---|
| 745,698 | Great Britain | Feb. 29, 1956 |

OTHER REFERENCES

Lyon et al.: "Journal of the Electrochemical Society," vol. 96, No. 6 (1949), pages 359–363.

"Chemical Engineering," August 1957, page 164.

Silica Gel Bulletin No. 2, September 1921, page 5. Published by the Silico Gel Corporation, 1100 Garrett Bldg., Baltimore.